United States Patent [19]

Mordick

[11] Patent Number: 5,219,030
[45] Date of Patent: Jun. 15, 1993

[54] SPRING FOR A SCALE AND METHOD OF ASSEMBLY OF SAME

[75] Inventor: Frank J. Mordick, Rockford, Ill.

[73] Assignee: Newell Operating Company, Freeport, Ill.

[21] Appl. No.: 821,210

[22] Filed: Jan. 16, 1992

[51] Int. Cl.$^5$ .......................... G01G 21/28; F16F 1/04; F16F 1/06; E04C 2/54
[52] U.S. Cl. ................... 177/128; 177/256; 267/74; 267/179; 52/787
[58] Field of Search .......... 177/128, 256–259; 267/74, 179; 52/787

[56] References Cited

U.S. PATENT DOCUMENTS

| | | | |
|---|---|---|---|
| 1,266,231 | 5/1918 | Dottl | 267/179 X |
| 1,624,562 | 4/1927 | Ronci | 267/74 X |
| 2,210,061 | 8/1940 | Caminez | |
| 2,700,788 | 2/1955 | Hennelly | 267/179 X |
| 3,061,054 | 10/1962 | Simmonds | |
| 3,132,860 | 5/1964 | Nantz | 267/179 X |
| 4,030,559 | 6/1977 | Fish et al. | |

FOREIGN PATENT DOCUMENTS

| | | |
|---|---|---|
| 61-26894 | 8/1986 | Japan . |
| 1-40017 | 12/1989 | Japan . |
| 1-307530 | 12/1989 | Japan .................. 267/179 |

Primary Examiner—George H. Miller, Jr.
Attorney, Agent, or Firm—James G. Staples

[57] ABSTRACT

An improved method of assembling conventional scales, including bathroom scales, is provided by employing an improved spring for connecting the upper housing to the bottom pan. The upper housing may now be connected to the bottom pan with a simple downward force imposed on the improved spring thereby hooking the bottom of the spring to the bottom pan and mateably engaging the tapered top of the spring in an extruded hole in the upper housing. The improved spring is tapered at the top end to mateably engage the extruded hole in the upper housing and includes only one hook on the bottom end for engagement with the bottom pan. The improved spring enables easier and faster assembly of conventional scales thereby reducing labor and production costs.

17 Claims, 2 Drawing Sheets

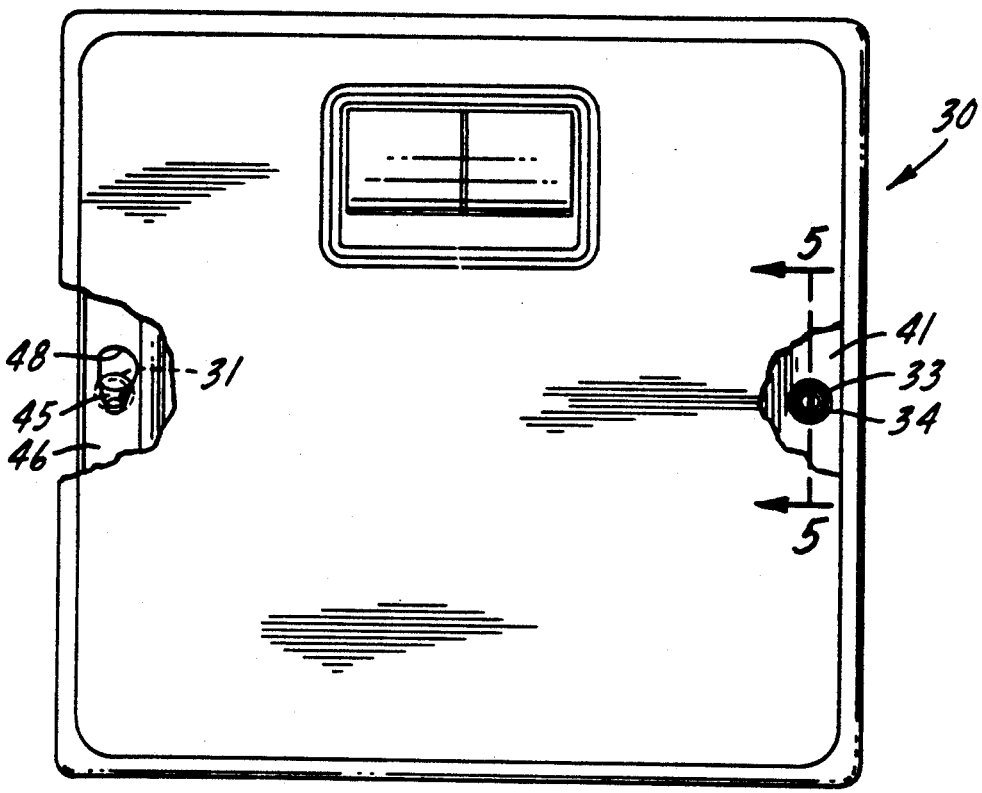
Fig. 4.
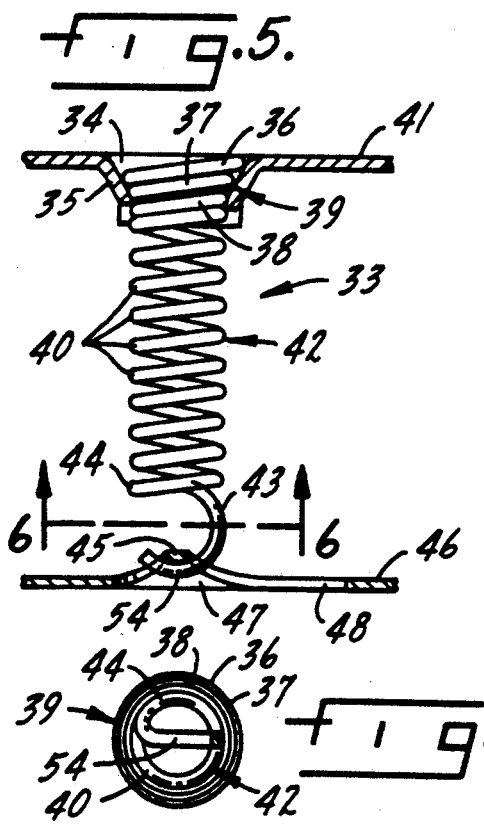
Fig. 5.
Fig. 6.
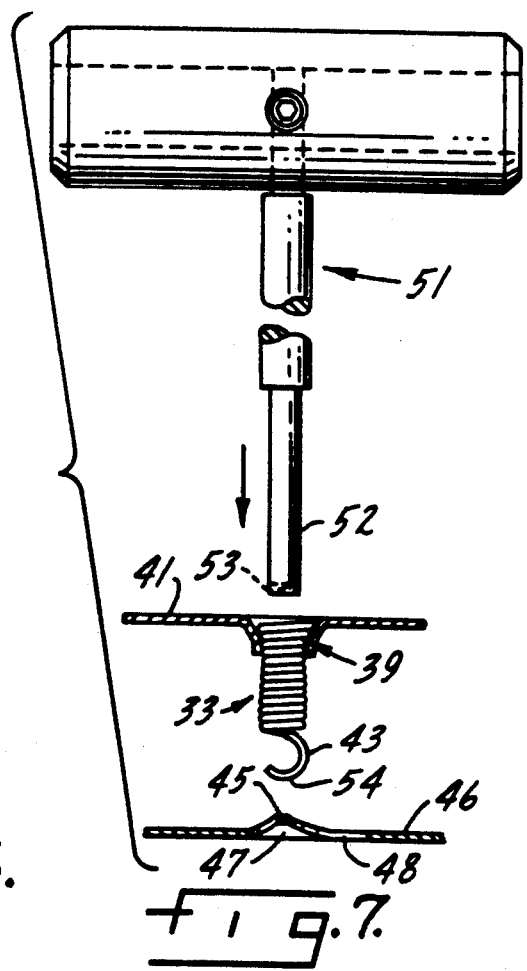
Fig. 7.

SPRING FOR A SCALE AND METHOD OF ASSEMBLY OF SAME

This invention relates to scales in general and specifically to bathroom-type scales which include a bottom pan, an upper housing and a scale mechanism disposed therebetween. The improvement contributed by this invention lies in the springs used to connect the upper housing to the bottom pan and also an improved method of assembly of the bottom pan and upper housing using the improved springs.

BACKGROUND OF THE INVENTION

Conventional scales, including bathroom-type scales include three major components: the bottom pan, the scale mechanism and the upper housing. The scale mechanism is disposed in between the upper housing and the bottom pan. The bottom pan is normally attached to the upper housing by two or more springs located on opposite sides of the scale mechanism. Each spring includes a hook on each end of the spring. One hook engages the bottom pan while the other hook engages the upper housing. Each spring extends from the bottom pan to the upper housing under tension thereby attaching the bottom pan to the upper housing.

A common problem associated with the manufacture of modern bathroom scales and scales in general is the attachment of the two or more springs to the upper housing and to the bottom pan. The springs, in the relaxed state, are shorter than the distance between the upper housing and bottom pan. Because the springs used for the assembly of scales have high tension spring constants, a great deal of force is required to stretch a spring from the bottom pan up to the upper housing.

When assembling bathroom scales using conventional springs, the operator first inserts the bottom hook of each spring through a bridge located on opposite sides of the scale mechanism on the bottom pan. Then, the upper housing is placed over the scale mechanism and bottom pan. The operator then must reach through the hole in the upper housing to grasp the top hook of the spring with a long hook-shaped tool. The operator must pull the spring upward with enough force to stretch the spring and then maneuver the top hook of the spring over the bridge located on the upper housing, all without losing grasp of the spring with the hook-shaped tool or disengaging the bottom hook from the bottom pan. This process is time-consuming, awkward and requires both strength and manual dexterity to complete the process rapidly.

This procedure takes a great deal of skill because the operator must be strong enough to stretch the spring upward and dexterous enough to manipulate the top hook of the spring over the bridge of the upper housing, all with the use of an awkward hook-shaped wire tool and while overcoming the resistive tension force exerted by the spring.

Consequently, the operation of connecting the springs from the bottom pan to the upper housing limits the manufacturers' ability to increase production of the scales. By hastening this awkward process, one can increase production, lower labor costs and thereby provide a less expensive product to the consumer.

The present invention overcomes the above problem by eliminating the need to reach through a hole in the upper housing to grasp the spring with a hook-shaped tool. A new spring has been developed that is inserted through the upper housing in one motion and attached to the bottom pan and with a minimum of manual dexterity. The awkward tools of the past have been replaced with a new easy-to-use tool. The present invention provides an approved assembly process for bathroom scales and scales in general, thereby reducing labor costs and production costs.

BRIEF DESCRIPTION OF THE INVENTION

The improved coil spring used for assembling a conventional scale includes a series of coils extending from a top end to a bottom end. The bottom end includes a hook disposed along the axial center of the coils. The tapered top end is conically shaped and includes at least two coils that are tapered so that the uppermost coil is of the largest diameter and the lower adjacent coils of the top end are of a smaller diameter. The coils comprising the middle portion extending down to the bottom end are of the smaller diameter. The tapered top end of the spring enables the top end of the spring to mateably engage an extruded hole in the upper housing of the scale without the hook-type connection used in the prior art. The bottom end of the spring includes a hook that extends downward from the bottom of the spring along the axial center of the spring.

The hook is attached to the bottom pan of the scale by inserting a tool through the top end down through the middle portion of the spring to engage the upper end, or connection portion, of the hook near the bottom of the spring. A downward force is applied to the tool thereby stretching the spring downward enabling the hook to engage a bridge or other attachment means on the bottom pan. The downward force exerted on the insertion tool and hook also firmly plants the tapered top end of the spring in the extruded hole in the upper housing. Therefore, in one swift motion, both ends of the spring, the top end and the bottom end, are attached to the upper housing and bottom pan respectively. This method is in stark contrast to the tedious method of hooking the bottom hook to the bottom pan and thereafter using a tool to pull up on the spring to hook a top hook to the upper housing.

BRIEF DESCRIPTION OF THE DRAWINGS

This invention is illustrated more or less diagrammatically in the accompanying drawings wherein:

FIG. 4 is a top plan view of a bathroom-type scale made in accordance with the present invention;

FIG. 5 is a section taken substantially along line 5—5 of FIG. 4 showing the improved spring of the present invention;

FIG. 6 is a section taken substantially along line 6—6 of FIG. 5; and

FIG. 7 is a front elevational view of the insertion tool as it is used with the improved spring of the present invention.

DETAILED DESCRIPTION OF THE INVENTION

Figure 1:
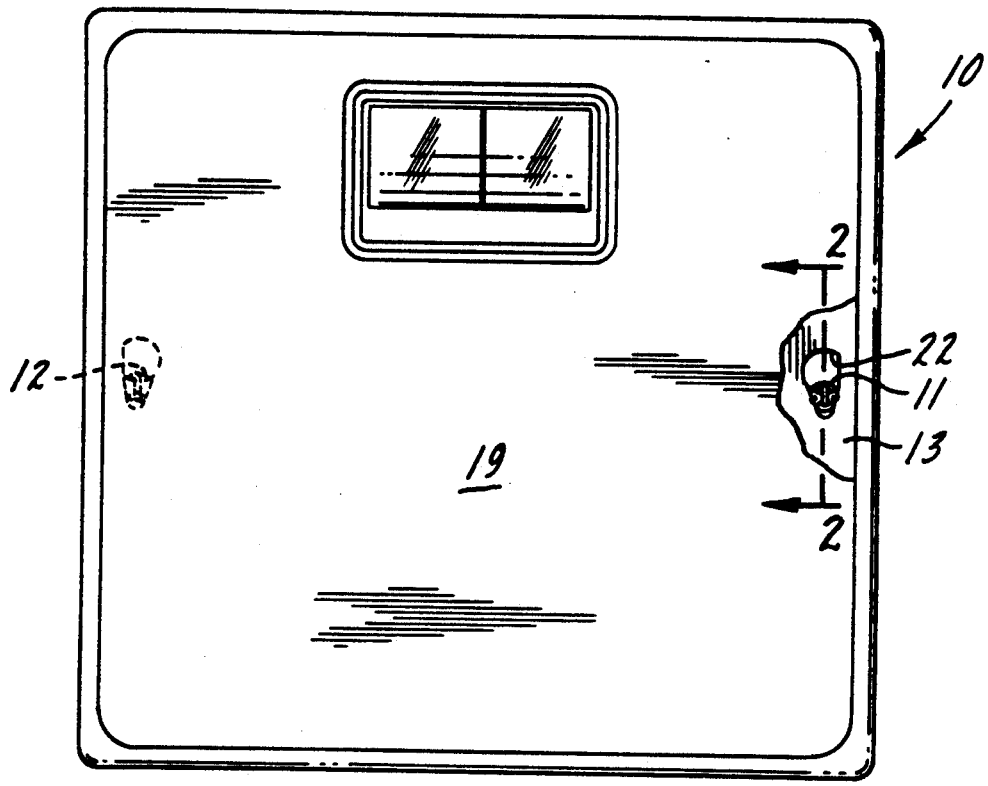
FIG. 1 is a top plan view of a bathroom-type scale made in accordance with the teachings of the prior art.

Like reference numerals will be used to refer to like or similar parts from Figure to Figure in the following description of the drawings.

Figure 2:
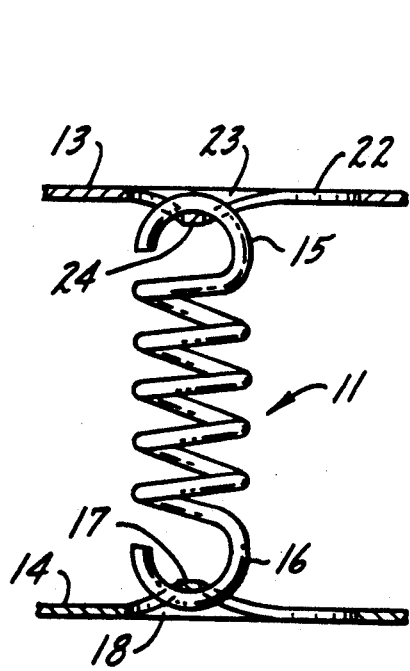
FIG. 2 is a section taken substantially along line 2—2 of FIG. 1.
Figure 3:
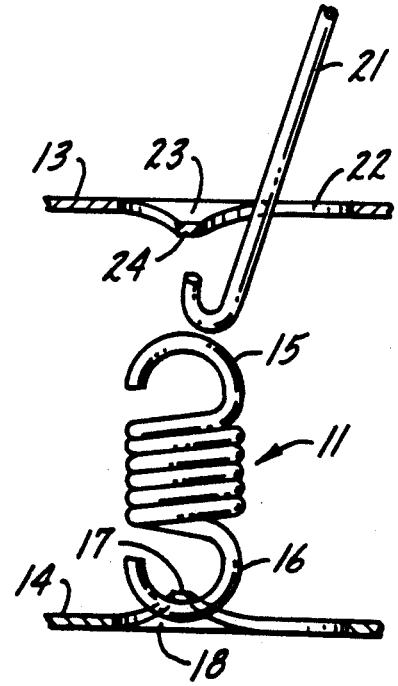
FIG. 3 shows the conventional spring of FIG. 2 and the conventional hook-type tool used to draw the spring upward for attachment to the upper housing.

The dramatic improvement provided by this invention is best understood after an examination of the prior art shown in FIGS. 1-3. One embodiment of a conventional scale is illustrated at 10 in FIG. 1. Conventional springs 11 and 12 provide a means for attaching the upper housing 13 to the bottom pan 14 (not shown in FIG. 1, partially shown in FIGS. 2 and 3). The cover pad 19 overlies the upper housing 13 and provides a foot receiving surface for the user.

As seen in FIG. 2, a conventional spring 11 includes two hooks, a top hook 15 and a bottom hook 16. The method of assembly of the upper housing 13 to the bottom pan 14 is illustrated in FIG. 3. The spring 11 either is dropped through the hole 23 of the upper housing 13 or the bottom hook 16 is attached to the bottom pan 14 before the upper housing 13 is assembled to the bottom pan 14. In either procedure, the bottom hook 16 fits through the open area 18 underneath the bridge 17 of the bottom pan 14. At this stage in the assembly, the spring 11 is in the relaxed or compressed state. Then, the operator must insert a conventional hook-type tool 21 (see FIG. 3) through the hole 22 in the upper housing to grasp the top hook 15 of the spring 11.

After the operator successfully grasps the top hook 15 of the spring 11, he or she must pull the spring upward thereby stretching it and enabling the top hook 15 to be fitted through the hole 22 and into the open area 23 over the bridge 24. This operation is tedious, time-consuming and requires both strength and dexterity to perform it rapidly enough for assembly-line production.

The single step of engaging the upper hook 15 through the hole 22 and into the open area 23 of the upper housing is a step which limits production capacity. By eliminating this step and replacing it with a faster production step, the rate of production of conventional scales is thereby increased. Increasing the rate of production lowers labor costs, production costs and thereby the cost to the consumer.

A scale manufactured according to the present invention is shown generally at 30 in FIG. 4. The left side of the scale includes a hole 31 for inserting an improved spring (not shown). An improved spring 33 is shown at the right side of FIG. 4 as inserted into the hole 34. The preferred method of practicing the present invention employs two improved springs 33, located on either side of the scale mechanism. However, scale designs with three or more springs are possible and within the scope of this invention.

The improved spring 33 is inserted into a circular extruded hole 34 (see FIG. 5). The width of hole 34 is narrowed by the angled side wall 35. The angle of the side wall 35 closely matches the taper of the uppermost coils 36, 37 and 38 of the top end 39 of the spring 33. Coils 36, 37 and 38 are of decreasing diameters and provide a tapered top end 39 to the spring 33. The tapered top end 39 of the spring 33 positively mateably engages the hole 34 and sidewall 35 of the upper housing 41 when a downward force is exerted on the spring 33.

The middle portion 42 of the spring 33 consists of a series of coils of like diameter. A hook 43 having a diametrically disposed connecting portion 54 is formed beneath the lowest coil 44 of the spring 33. The hook 43 fits through the open area 47 underneath the bridge 45 of the bottom pan 46.

FIG. 6 is a bottom view of the spring illustrating the tapered top end 39 and the decreasing diameters of coils 36, 37 and 38. All the coils 40 of the midsection 42 are of like diameter.

The improved process for attaching the upper housing 41 to the bottom pan 46 with the improved spring 33 is best illustrated in FIG. 7. An insertion tool, shown generally at 51 is inserted through the top end 39 of the spring 33. The lower end 52 of the insertion tool 51 includes a groove 53 which engages the connecting portion 54 of the bottom hook 43. The groove 53 engages the connecting portion 54 of the hook 43 enabling the operator to quickly push downward stretching the spring 33 and enabling the hook 43 to fit through the hole 48 into the open area 47 and under the bridge 45 of the bottom pan 46 (see also FIG. 4). The groove 53 of the insertion tool 51 should be wide enough to accommodate the diameter of the connecting portion 54 of the hook 43, yet narrow enough to engage the connecting portion 54 positively.

In stark contrast to the tedious and time-consuming operation illustrated in FIG. 3, an operator employing the spring 33 and insertion tool 51 of FIG. 7 connects the upper housing 41 to the bottom pan 46 in one swift, easy motion. Engaging a hook 43 under or through a bridge 45 requires less dexterity when the operator is pushing down on the spring 33 than when he or she is pulling upward. Simply put, it takes less dexterity to push down in a controlled fashion than pull up in a controlled fashion.

It should also be noted that the above method will work if the bridge 45 is located in the upper housing 41 and the extruded hole 34 is located on the bottom pan. The bottom pan may be attached to the upper housing in the same manner in which the upper housing is attached to the bottom pan as discussed above.

Although preferred embodiments of the present invention have been illustrated and described, it will at once be apparent to those skilled in the art that variations may be made within the spirit and scope of the invention. Accordingly, it is intended that the scope of the invention be limited solely by the scope of the hereafter appended claims and not by the specific words in the foregoing description.

I claim:

1. A coil spring for a scale, the spring comprising:
    a top end;
    a bottom end;
    a middle portion;
    the top end including at least two coils, the coils of the top end tapering down in size from a first larger diameter to a second smaller diameter, the tapered top end mating with a hole in an upper or lower pan of the scale, said hole contoured to the top end, the uppermost coil of the top end being of the first larger diameter, the lowermost coil of the top end being of the second smaller diameter;
    the bottom end of the spring comprising a hook means, the hook means being positioned along the axial center of the spring, the hook means including a hook at its lower distal end and a connecting portion which connects the hook to the middle portion of the spring, the connecting portion being generally diametrically located with respect to the periphery of the spring; and the middle portion extending from the lowermost coil of the top end to the connecting portion of the hook means at the bottom end, the middle portion comprising a series of coils having a third diameter, the third diameter being smaller than the second diameter of the lowermost coil of the top end.

2. The spring of claim 1, wherein the middle portion further comprises a series of coils of like diameter.

3. In combination, a coil spring for a scale and a tool for assembling the coil spring to a scale, the coil spring comprising:
a top end;
a bottom end;
a middle portion;
the top end including at least two coils, the coils of the top end tapering down in size from a first larger diameter to a second smaller diameter, the tapered top end mating with a hole in an upper or lower pan of the scale, said hole contoured to the top end, the uppermost coil of the top end being of the first larger diameter, the lowermost coil of the top end being of the second smaller diameter;
the bottom end of the spring comprising a hook means, the hook means being positioned along the axial center of the spring, the hook means including a hook at its lower distal end and a connecting portion which connects the hook to the middle portion of the spring, the connecting portion being generally diametrically located with respect to the periphery of the spring; and
the middle portion extending from the lowermost coil of the top end to the connecting portion of the hook means at the bottom end, the middle portion comprising a series of coils having a third diameter, the third diameter being smaller than the second diameter of the lowermost coil of the top end;
the tool comprising:
an elongated shaft with a handle on an upper end thereof and a slotted groove on the lower end thereof;
the diameter of the shaft being smaller than the third diameter of the coils of the middle portion;
the slotted groove sized to mateably engage the connecting portion of the hook means.

4. An improved scale, the scale including a bottom pan, an upper housing and a scale mechanism therebetween, the improvement comprising:
at least two coil springs for attaching the upper housing to the bottom pan, each spring comprising:
a top end;
a bottom end;
a middle portion;
the top end including at least two coils, the coils of the top end tapering down in size from a first larger diameter to a second smaller diameter, the tapered top end mating with a hole in an upper or lower pan of the scale, said hole contoured to the top end, the uppermost coil of the top end being of the first larger diameter, the lowermost coil of the top end being of the second smaller diameter;
the bottom end of the spring comprising a hook means, the hook means being positioned along the axial center of the spring, the hook means including a hook at its lower distal end and a connecting portion which connects the hook to the middle portion of the spring, the connecting portion being generally diametrically located with respect to the periphery of the spring; and
the middle portion extending from the lowermost coil of the top end to the connecting portion of the hook means at the bottom end, the middle portion comprising a series of coils having a third diameter, the third diameter being smaller than the second diameter of the lowermost coil of the top end.

5. The scale of claim 4, wherein the connecting portion of the hook means engages an insertion tool.

6. The scale of claim 4, wherein the hook engages a bridged area located on the bottom pan of the scale.

7. The scale of claim 4, wherein the hook engages a bridged area located on the upper housing of the scale.

8. The scale of claim 4, wherein the top end of the spring mateably engages an extruded hole in the upper housing of the scale.

9. The scale of claim 4, wherein the top end of the spring mateably engages an extruded hole in the bottom pan of the scale.

10. The scale of claim 4, wherein the top end of the spring mateably engages a formed hole in the upper housing of the scale.

11. The scale of claim 4, wherein the top end of the spring mateably engages a formed hole in the bottom pan of the scale.

12. A method for inserting a spring into a scale, the spring connecting the upper housing of the scale to the bottom pan of the scale, the method comprising:
placing the spring into a hole with contoured sides, the hole being located in the upper housing of the scale, the spring including:
a top end;
a bottom end;
a middle portion;
the top end including at least two coils, the coils of the top end tapering down in size from a first larger diameter to a second smaller diameter to match the contoured sides of the hole, the uppermost coil of the top end being of the first larger diameter, the lowermost coil of the top end being of the second smaller diameter;
the bottom end of the spring comprising a hook means, the hook means being positioned along the axial center of the spring, the hook means including a hook at its lower distal end and a connecting portion which connects the hook to the middle portion of the spring, the connecting portion being generally diametrically located with respect to the periphery of the spring; and
the middle portion extending from the lowermost coil of the top end to the connecting portion of the hook means at the bottom end, the middle portion comprising a series of coils having a third diameter, the third diameter being smaller than the second diameter of the lowermost coil of the top end;
engaging the connecting portion of the hook means with an insertion tool;
applying downward pressure to the insertion tool thereby stretching the spring downward; and
inserting the hook under a bridge of a bottom pan of the scale, the hook thereby engaging the bridge of the bottom pan.

13. A method for inserting a spring into a scale, the spring connecting the upper housing of the scale to the bottom pan of the scale, the method comprising:
placing the spring into a hole of the upper housing of the scale, the spring including a top end with a means for mateably engaging the hole of the upper housing, the means for mateably engaging the hole of the upper housing including at least two coils tapering down in size from a first larger diameter to a second smaller diameter, the uppermost coil of the top end being of the first larger diameter, the lowermost coil of the top end being of the second smaller diameter, the tapered top end mating with a hole in an upper or lower pan of the scale, said hole contoured to the top end, the spring also including a middle portion and a bottom end with hook means, the middle portion comprising a series of coils having a third diameter, the third diameter being smaller than the second diameter of the lowermost coil of the top end;

the hook means including a connecting portion disposed in between the middle portion and the bottom end, and a hook for attachment to the bottom pan;

engaging the connecting portion of the hook means with an insertion tool;

applying downward pressure to the insertion tool thereby stretching the spring downward;

attaching the hook to an attachment means of bottom pan of the scale.

14. The method of claim 13, wherein the means for mateably engaging the spring with the hole includes the top end of the spring being tapered enabling the upper portion of the spring to securely mateably engage the hole and the middle and bottom portions of the spring to pass through the hole and extend toward the bottom pan.

15. The method of claim 13, wherein the attachment means of the bottom pan is an upwardly extending bridge area with an open area underneath whereby the hook fits through the open area.

16. The method of claim 13, wherein the insertion tool fits inside the coils of the spring and includes a slot for engaging the connection portion of the hook means.

17. A method for inserting a spring into a scale, the spring connecting the bottom pan of the scale to the upper housing of the scale, the method comprising:

orientating the scale so that the bottom pan faces upward and the upper housing faces downward;

placing the spring into a hole of the bottom pan of the scale, the spring including a top end with a means for mateably engaging the hole of the bottom pan, the means for mateably engaging the hole of the bottom pan including at least two coils tapering down in size from a first larger diameter to a second smaller diameter, the tapered top end mating with a hole in an upper or lower pan of the scale, said hole contoured to the top end, the uppermost coil of the top end being of the first larger diameter, the lowermost coil of the top end being of the second smaller diameter, the spring also including a middle portion and a bottom end with hook means, the middle portion comprising a series of coils having a third diameter, the third diameter being smaller than the second diameter of the lowermost coil of the top end;

the hook means including a connecting portion disposed in between the middle portion and the bottom end, and a hook for attachment to the upper housing;

engaging the connecting portion of the hook means with an insertion tool;

applying downward pressure to the insertion tool thereby stretching the spring downward toward the upper housing;

attaching the hook to an attachment means of the upper housing of the scale.

* * * * *